United States Patent [19]
Rando

[11] 3,805,142
[45] Apr. 16, 1974

[54] CURRENT LIMIT CIRCUIT WITH SUPERSEDING CHARACTERISTIC TO ACTIVATE OVERCURRENT PROTECTION CIRCUIT

[75] Inventor: Robert Rando, Brooklyn, N.Y.

[73] Assignee: Bell Telephone Laboratories, Incorporated, Murray Hill, N.J.

[22] Filed: Jan. 10, 1973

[21] Appl. No.: 322,555

[52] U.S. Cl. ............... 321/11, 321/19, 317/33 SC
[51] Int. Cl. ............................................. H02m 1/18
[58] Field of Search ............ 317/33 SC; 321/11, 18, 321/19

[56] References Cited
UNITED STATES PATENTS

| | | | |
|---|---|---|---|
| 3,376,487 | 9/1968 | Bixby | 321/19 X |
| 3,461,374 | 8/1969 | Rhyne, Jr. | 321/19 X |
| 3,480,852 | 11/1969 | Hung | 321/19 X |
| 3,602,804 | 8/1971 | Randall | 323/20 |
| 3,614,587 | 10/1971 | Schwarz | 321/19 X |
| 3,743,887 | 7/1973 | Keough et al. | 317/33 SC X |

*Primary Examiner*—William M. Shoop, Jr.
*Attorney, Agent, or Firm*—A. G. Steinmetz

[57] ABSTRACT

A current and voltage regulated DC to DC converter is designed with protection features to permit its operation in parallel with like DC to DC converters. The features are designed to assure shutdown protection against overcurrent and overvoltage conditions and to assure that each converter will contribute a current to the common load. The protection features include a selective high voltage shutdown to shut down only the converter causing an overvoltage and an overcurrent protection circuit to supersede the normal current regulation in response to a fault condition. A reverse current shutdown circuit protects the common load from faults and short circuits internal to the converter circuit. These protection features permit the converters to operate in parallel without shutting down the entire system should an individual converter malfunction.

8 Claims, 3 Drawing Figures

3,805,142

CURRENT LIMIT CIRCUIT WITH SUPERSEDING CHARACTERISTIC TO ACTIVATE OVERCURRENT PROTECTION CIRCUIT

BACKGROUND OF THE INVENTION

This invention relates to converter circuits and, more particularly, to converter circuits connected in parallel to a common bus. It is specifically concerned with voltage and current regulated converters and the overcurrent protection thereof.

In situations where a plurality of voltage and current regulated converters are connected in parallel to a common bus, each converter may supply its regulated ouptut current in response to a fault on the bus or at the output load. Because the converters are current regulated, no converter supplies an overcurrent but each converter continues to operate at its full rated current output. This current may be insufficient to operate protection devices such as fuses. Each converter may continue to supply this current for a long period of time. This draws full power from all of the converters, resulting in a loss of efficiency, and in some instances the continuous power drain may cause heat dissipation problems. This condition would significantly lower the bus voltage, thereby adversely affecting the connected load.

It is therefore an object of the invention to supersede the current regulation control in a parallel connected current regulated converter and permit the resulting overcurrent to operate protection devices.

It is a further object to shut down the converter in response to a sustained overload condition.

Converters connected in parallel to a common bus may individually experience internal short-circuit conditions. In such situations all the current applied by the balance of the converters connected to the bus may flow into the converter experiencing the short-circuit condition. A method of preventing such reverse currents is to use blocking diodes, but this has proved to be inefficient and wasteful of power.

It is therefore another object of the invention to monitor reverse current flow from a bus to a converter connected thereto and operate protective devices to disconnect the converter from the bus.

SUMMARY OF THE INVENTION

Therefore, in accordance with the invention, parallel connected voltage and current regulated converters each include voltage sensing means to monitor their voltage output. If the voltage output sensed drops below some predetermined threshold value in response to a bus short circuit, the current regulation control is superseded by a power limit circuit.

The converter comprises a power circuit which stores energy in a transformer. This energy is periodically discharged through an output diode. Each converter has a power limit circuit which monitors the duration of the output current through the output diode in each cycle. When the duration of this current exceeds a predetermined threshold and the output voltage is low, as is the normal circumstance with a load fault, the normal current regulation circuit is inhibited. The resulting overcurrent is utilized to operate protective devices. If the overcurrent is sustained, an overcurrent shutdown circuit is activated to shut down the converter.

A feature of the invention is the inclusion of current direction monitors to monitor the direction of current flow in the converter's output circuitry. This circuitry operates to shut down and disconnect the converter from the bus upon the detection of a reverse current. This protects the bus from high currents drawn by the converter should a fault internal to the converter develop.

BRIEF DESCRIPTION OF THE DRAWINGS

An understanding of the invention may be readily attained by referring to the detailed description hereinbelow and the drawings described wherein.

DETAILED DESCRIPTION

Figure 1:
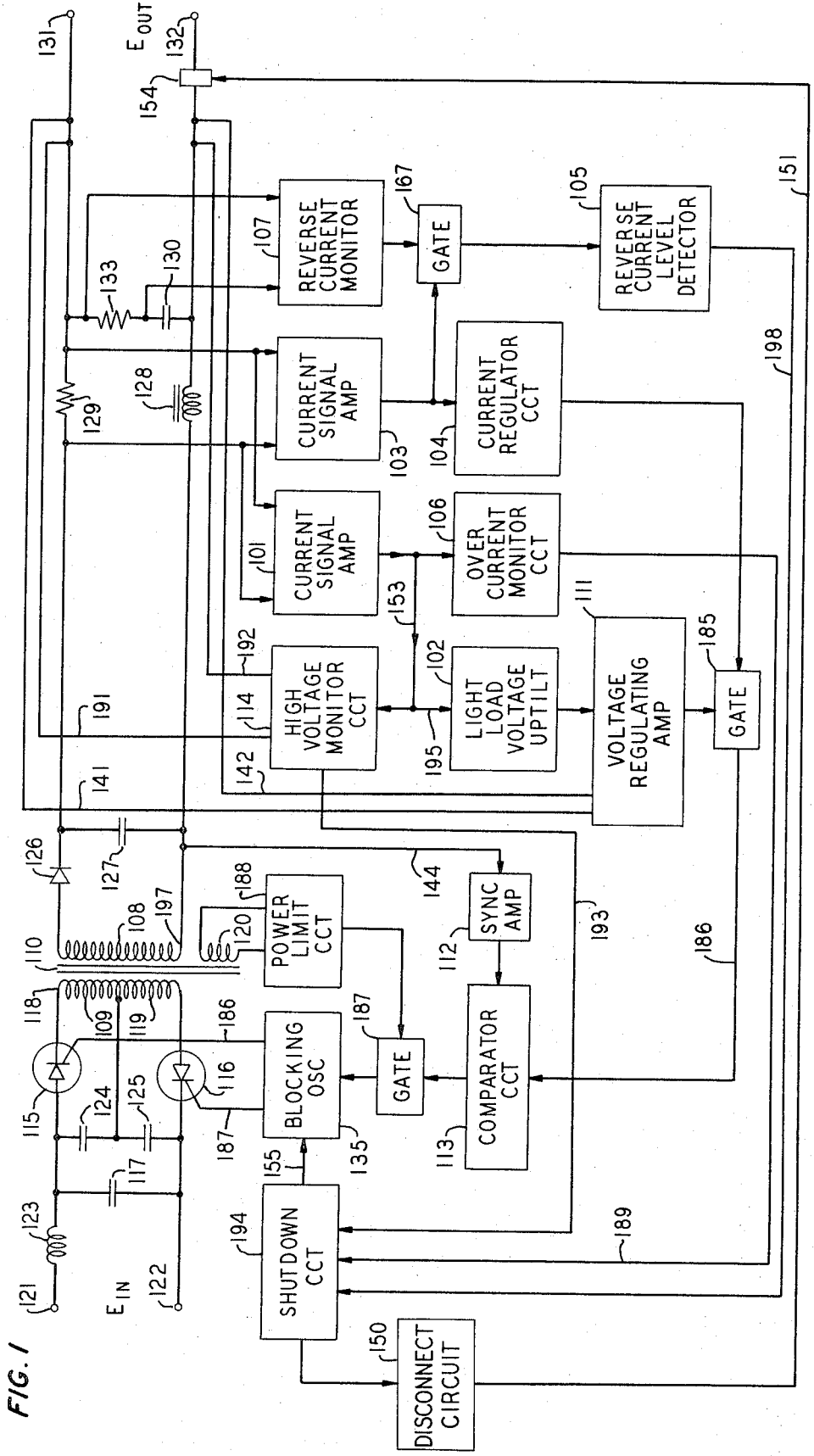
FIG. 1 is a block diagram of a converter having overcurrent and reverse current protection features according to the principles of the invention.

The DC to DC converter disclosed in block diagram form in FIG. 1 is designed to be operated in parallel with other converters. This converter includes both overvoltage and overcurrent protection features designed to facilitate parallel operation. The overcurrent protection circuitry includes means to supersede the normal current regulation of the converter in order to provide increased output current capacity to facilitate clearing of faults on the output bus. Shutdown of the converter in case of a sustained overload on the bus is also provided for protection of the converter. The high voltage protection shutdown is selective so that only the converter causing an overvoltage is shut down. In addition, the converter includes means to assure the currrent contribution of each converter to the bus and to provide reverse current protection. These characteristics may be readily ascertained by inspection of the current-voltage diagram of the converter characteristics in FIG. 2 which are described in detail hereinbelow in conjunction with the description of the power converter circuit disclosed in FIG. 1.

POWER CIRCUIT

The power circuit portion of the converter comprises two input terminals 121 and 122 to which a direct-current voltage source may be connected. The output of the direct-current source is smoothed to reduce variations by an input filter comprising an inductor 123 and a capacitor 117. The power circuit itself comprises the two controlled switching devices 115 and 116 which in the illustrative embodiment are silicon controlled rectifiers. The two silicon controlled rectifiers 115 and 116 are poled in the same direction and connected to opposite terminals of the primary winding 118 of the power transformer 110. The primary winding 118 is center tapped to form two winding segments 109 and 119. The winding segments 109 and 119 form two LC resonant networks in series with the parallel combination of the capacitors 125 and 124. Capacitors 124 and 125 may be considered to be connected in parallel since the impedance of capacitor 117 is very small at the resonant frequency.

Each silicon controlled rectifier, which are subsequently referred to herein as SCR diodes, is connected in series with an LC resonant network. The SCR diode 115 is connected in series with the winding segment 109, which is one-half of the primary winding 118, and the capacitors 125 and 124. The SCR diode 116 is connected in series with the winding segment 119 and the capacitors 124 and 125. The SCR diodes 115 and 116 conduct alternately to charge and discharge the capacitors 125 and 124. The SCR diodes 115 and 116 are driven by simultaneous gate trigger signals which are applied to the trigger leads of the SCR diodes 115 and 116 by a blocking oscillator 135. These signals are applied to the trigger leads of the SCR diodes 115 and 116 via leads 186 and 187, respectively. At the beginning of each conduction period one SCR diode is reverse-biased and the other SCR diode is forward-biased.

If, for example, SCR diode 115 is forward-biased, it will conduct in response to the trigger signal supplied by the blocking oscillator 135, via lead 186. The SCR diode 115 will conduct current through the winding segment 109 to charge the capacitors 125 and 124. During this period the SCR diode 116 is reverse-biased by the voltage across the capacitor 125. As the trigger inputs of the SCR diodes 115 and 116 are pulsed, the power circuit will resonate at a frequency determined by the parameters of the capacitor 124 and 125 and the winding segments 109 and 119. The capacitor 125 eventually charges to the point where the SCR diode 115 becomes reverse-biased and it ceases to conduct. In the meantime the capacitor 124 has charged to a voltage at which the SCR diode 116 is forward-biased and it will conduct in response to the next trigger signal input.

CONVERTER OUTPUT CIRCUIT

When either of the SCR diodes 115 and 116 are conducting, the initial polarity across the output winding 108 of the power transformer 110 is such that output diode 126 is back-biased.

As the capacitors 124 and 125 charge or discharge, depending upon the respective conducting states of the SCR diodes 115 and 116, the voltage across the secondary winding 108 of the power transformer 110 reverses and attains the regulated output voltage level. At this point the output diode 126 becomes forward-biased, the conducting one of the SCR diodes commutates, and the energy stored in the transformer 110 is discharged into the output filter of the converter as a ramp of current. The output filter comprising the capacitor 127 and the inductor 128 smooths the output signal applied to the output terminals 131 and 132. The output voltage of the converter is directly proportional to the switching frequency of the SCR diodes 115 and 116. The converter output is regulated by controlling the frequency of the blocking oscillator.

The output signals of the converter circuit are monitored to supply feedback signals to control the current and voltage outputs of the converter by controlling the frequency of operation of the blocking oscillator 135. The output current is monitored by sensing the voltage drop across a current sensing resistor 129 connected in series with the output terminal 131. A series connected resistor 133 and capacitor 130 shunt the output terminals 131 and 132. The capacitor 130 filters the output signal and the resistor 133 is utilized to detect reverse currents. The voltage across the sensing resistor 129 is monitored by the two current signal amplifiers 101 and 103. A high voltage monitor circuit 114 and a voltage regulating amplifier 111 have monitoring terminals connected to the output terminals 131 and 132.

VOLTAGE REGULATION

The voltage output of the converter is regulated in response to the voltage regulating amplifier 111 which monitors the output voltage at output terminals 131 and 132 of the converter, via leads 141 and 142. The voltage regulating amplifier 111 sums the converter output voltage with a reference voltage to produce an amplified direct-current error signal. This signal is applied through a diode gate 185 to a comparator circuit 113 via lead 186. The comparator circuit compares this signal with a signal supplied by the sync amplifier 112.

The input of the sync amplifier 112 is supplied via lead 144 from one terminal 197 of the secondary winding 108 of the power transformer 110. The output of the sync amplifier 112 is the amplified version of the converter's output ripple signal. This signal is compared by the comparator circuit 113 with the amplified direct-current error signal supplied by the voltage regulating amplifier 111. The comparator circuit 113 supplies a signal, via the gate 187, to control the frequency of the blocking oscillator 135 and hence regulate the output voltage. The normal voltage regulation characteristic of the converter is shown by waveform a in FIG. 2.

POWER LIMIT CONTROL

A second signal is supplied to the blocking oscillator 135 by the power limit circuit 188. The power limit circuit 188 is connected to the transformer winding 120 which is energized by conduction in the secondary winding 108 of the power transformer 110. The function of the power limit circuit 188 is to supply a control signal, via gate 187, to the blocking oscillator 135 to inhibit its operation whenever the output diode 126 is conducting. The power limit circuit in severe overload conditions of the converter overrides the current regulation control of the converter as described hereinbelow.

CURRENT REGULATION

The output current of the converter is monitored by the current signal amplifier 103 whose input terminals are connected across the current sensing resistor 129. The output of the current signal amplifier 103 is a voltage signal which is directly proportional to the converter output current. The current signal amplifier 103 applies this voltage signal to the current regulator circuit 104. When the current through the sensing resistor 129 exceeds the converter's rated current, the signal applied by the current signal amplifier 103 to the current regulator circuit 104 causes it to respond and generate an output signal. The output signal of the current regulator circuit 104 is applied to the gate 185 where it functions to over-ride the output of the voltage regulating amplifier 111. This regulation signal is applied, via lead 186, to the comparator circuit 113. The comparator circuit 113 responds and supplies signals to control the frequency of the blocking oscillator 135 to limit the current output of the converter circuit. The current regulation characteristic is shown by the waveform b in FIG. 2.

HIGH VOLTAGE SHUTDOWN

A high voltage monitor circuit 114 has its input connected to the output terminals 131 and 132, via leads 191 and 192. The high voltage monitor circuit 114 continuously monitors the converter output voltage. The occurrence of a high output voltage above a predetermined threshold causes the high voltage monitoring circuit 114 to generate an ouptut signal. This output signal is applied, via lead 193, to operate the shutdown circuit 194. The shutdown circuit 194 includes an output connected to a disconnect circuit 150. The disconnect circuit 150 responds to the output of the shutdown circuit 194 and applies a signal, via lead 151, to activate a circuit-breaking device 154 to disconnect the converter from the load or bus. Another output lead 155 utilizes the output of the shutdown circuit 194 to shut down the blocking oscillator 135.

Figure 2:
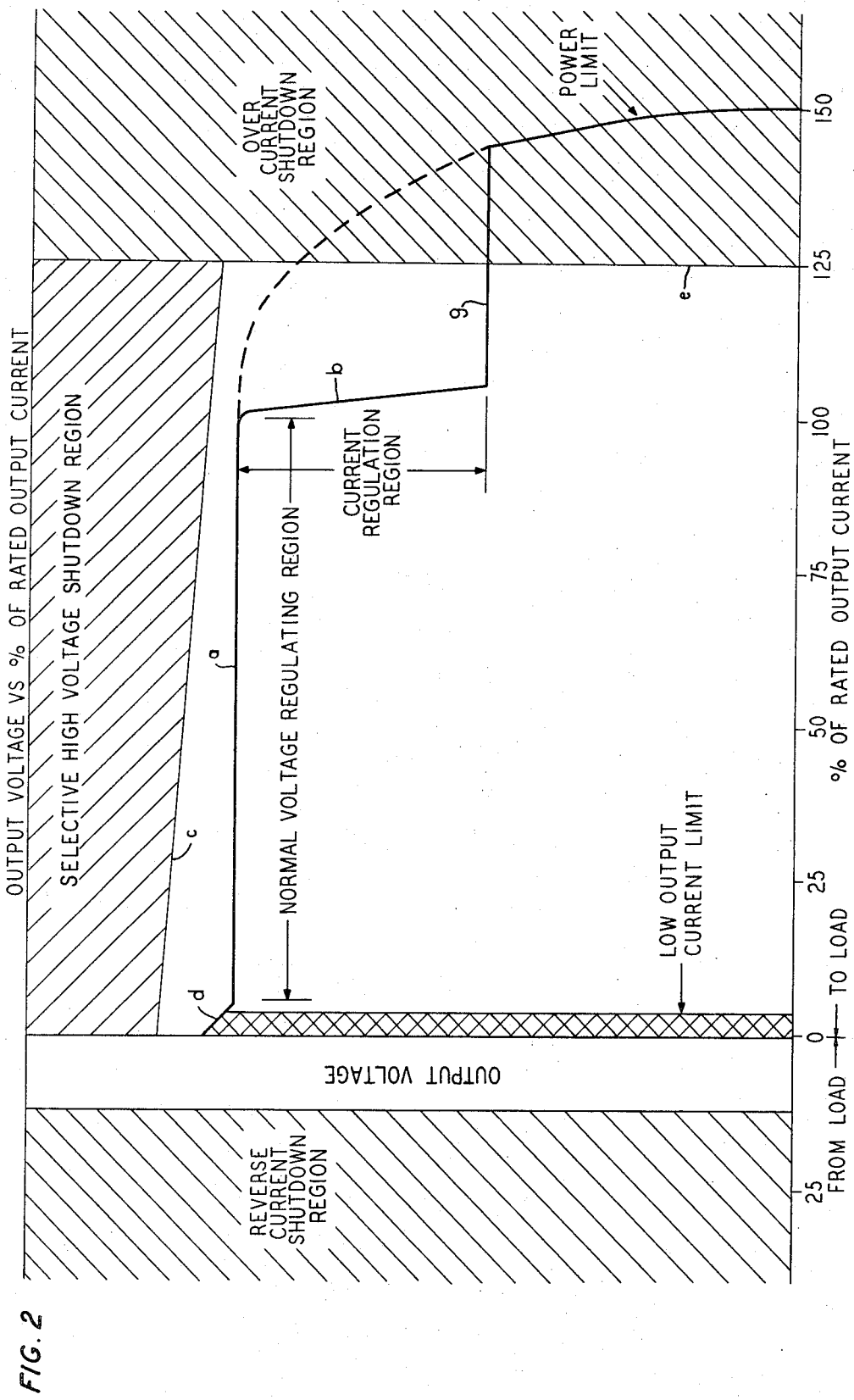
FIG. 2 is a voltage current diagram which specifies the regulation and protection characteristics of the converter disclosed in FIG. 1.

The high voltage threshold at which the high voltage monitoring circuit 114 operates is a function of the output load current of the converter. This may be readily ascertained by inspection of the voltage characteristic of the voltage curve c as shown in FIG. 2.

When two or more converters are operated in parallel, a failure of the voltage regulation control in any one converter applies an overvoltage to the output terminals of all the converters connected in parallel. Normally the malfunctioning converter supplies a higher output current. Selective shutdown of the individual converter causing the high voltage is required. This selection is made by generating a bias signal proportional to the converter current and using it to control the threshold at which the high voltage monitor circuit 114 responds. This bias signal is supplied to the high voltage monitoring circuit, via lead 153, from the current signal amplifier 101. This bias signal supplied by the current signal amplifier 101 produces in the high voltage monitor circuit 114 a linearly decreasing high voltage shutdown threshold proportional to the increasing converter output current. Hence, the malfunctioning converter has a lower shutdown threshold since its output current is larger than the other converters. It is apparent from the foregoing that the current supplied by the other normally functioning converters connected to the same bus is reduced and their high voltage shutdown threshold is consequently increased as their output current is decreased. Therefore, the individual converter responsive for the overvoltage condition has the lowest voltage shutdown threshold and hence is selectively shut down.

The output signal of the high voltage monitor circuit 114 is applied directly, via lead 193, to the shutdown circuit 194. Its output signal activates the shutdown circuit 194 which operates to inhibit the blocking oscillator 135 and activate the disconnect circuit 150. This shuts down the converter circuit and isolates it from the load.

CURRENT CONTRIBUTION CONTROL

The ouptut of the current signal amplifier 101 is also connected, via leads 153 and 195, to a light load voltage uptilt circuit 102. The voltage uptilt characteristic is shown by waveform d in FIG. 2. As is apparent from inspection of the voltage waveform d in FIG. 2, the light load voltage uptilt circuit 102 operates to provide an increased slope to the voltage regulation characteristic of the converter by modifying the response of the voltage regulating amplifier 111.

Normally a plurality of converters connected in parallel to a common bus will not share equally in supplying the bus current. Some converters may deliver no current at all even though they are operating at their regulated voltage. According to the invention, as the current output of the converter decreases below some specified threshold, the regulated voltage characteristic of the converter is increased linearly. This is to insure that the converter will supply at least a minimum current to the common bus.

The light load voltage uptilt circuit 102 is responsive to the output of the current signal amplifier 101. As the input signal supplied by the current signal amplifier 101 decreases below some specified threshold, the light load voltage uptilt circuit 102 generates a bias signal which is applied to the voltage regulating amplifier 111. This bias signal is inversely proportional to the output current of the converter. This bias signal produces a linear increase in the voltage regulation threshold of the converter. Hence, the voltage regulating amplifier 111 now regulates the output of the converter at a higher voltage. The higher voltage regulation threshold insures that the converter will supply at least a minimum output current to the bus. The output of the light load voltage uptilt circuit 102 may be utilized to operate an alarm since a converter at a very low current output may be operating in an abnormal condition or may have failed.

OVERCURRENT SHUTDOWN

The output current of the converter through the current sensing resistor 129 is sensed by the current signal amplifier 101 to operate the overcurrent protection shutdown of the converter 132. The current signal amplifier 101 produces an output signal directly proportional to the converter's output current. The output of the current signal amplifier 103 is applied to the overcurrent monitor circuit 106. The overcurrent monitor circuit 106 includes a time delay to prevent nuisance shutdowns caused by momentary overcurrent current outputs, and also to allow the over-current a sufficient duration to operate any protective device on the bus. Should the converter output current exceed the shutdown threshold for a sufficient period of time, the output of the current signal amplifier 101 is sufficient to operate the overcurrent monitor circuit 106.

The output of the overcurrent monitor circuit 106 is directly applied, via lead 189, to operate the shutdown circuit 194. The shutdown circuit output activates the disconnect circuit 150 which in turn operates the circuit-breaking device 154 to disconnect the converter from the bus or load attached to the output terminals 131 and 132.

As described hereinabove, the output of the converter is current regulated and hence the overcurrent condition does not normally occur. Even though the current output is regulated, it is desirable to shut down the circuit should a sustained short circuit occur on the bus. The overcurrent protection is also desirable as a backup system should the normal current regulation circuitry fail to operate.

In such overcurrent conditions, the current conducted through the output diode 126, although limited, has a long duration. The power limit circuit 188 inhibits the operation of the blocking oscillator as long as the output diode 126 conducts. During severe overload conditions, therefore, the power limit circuit 188 inhibits the operation of the blocking oscillator 135 in response to the sustained conduction through the output diode 126.

The output voltage of the bus also decreases in response to a short circuit or fault. This decrease is monitored by the comparator 113 which includes a reference voltage device which renders it inactive at low converter output voltages. When this low voltage occurs, the normal current regulation of the converter is rendered inactive, and the converter circuit operates in response to the overcurrent monitor circuit 106. Hence, a shutdown signal is supplied from the overcurrent monitor 106, via leads 189, to the shut-down circuit 194 to shut down the converter by inhibiting the blocking oscillator 135. The shutdown circuit 194 also activates the disconnect circuit 150 which in turn activates the circuit-breaking device 154 to disconnect the converter from the bus or the load. The overcurrent shutdown characteristic of the converter may be readily ascertained by reference to waveform e in FIG. 2.

REVERSE CURRENT PROTECTION

If a short circuit or fault internal to the converter should occur, the bus will supply current in a reverse direction to the converter. The current signal amplifier 103 is utilized to monitor the current direction through the sensing resistor 129. Should the current signal amplifier 103 detect a reverse current, a signal is provided to the reverse current level detector 105 via the gate 167. Upon the detection of a reverse current signal, the reverse current level detector 105 applies a signal, via lead 198, to the shutdown circuit 194. The shutdown circuit 194 operates to inhibit the blocking oscillator and shut down the converter. The output of the shutdown circuit 194 also activates the disconnect circuit 150 which operates the circuit-breaking device 154 to disconnect the converter from the bus or the load.

The input to the reverse current monitor circuit 107 is shunted across the resistor 133 which is connected in series with the filter capacitor 130. Should the current therein increase above a specified threshold indicating a a failure of the filter capacitor 130, the reverse current monitor 107 generates an output signal. The output signal of the reverse current monitor circuit 107 is applied, via gate 167, to operate the reverse current level detector 105. The output of the reverse current level detector 105 is applied, via lead 198, to operate the shutdown circuit 194 and disconnect the converter from the bus or the load as described hereinabove.

Figure 3:
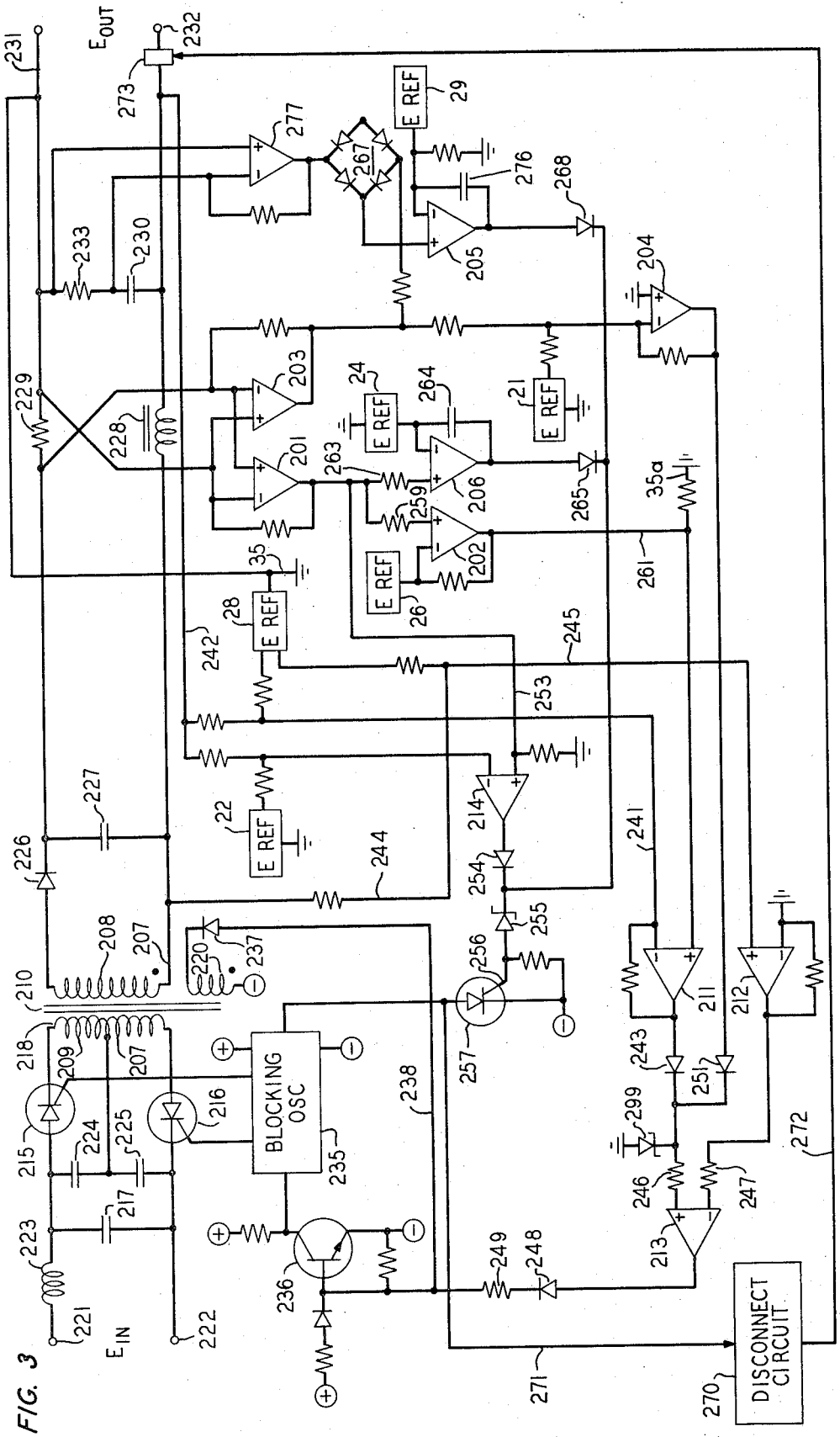
FIG. 3 is a schematic of a DC to DC converter as shown in FIG. 1, showing an illustrative embodiment utilizing operational amplifiers.

The circuit schematic illustrated in FIG. 3 shows an embodiment of the DC to DC converter, according to the invention, utilizing operation amplifiers. The power circuit portion of the converter operates substantially the same as was described with reference to the converter shown in FIG. 1. A DC voltage source is coupled to the input terminals 221 and 222 and is connected to the switching devices of the inverter, via an input filter comprising the inductor 223 and the capacitor 217. The filtered voltage of the DC voltage source is applied to the two SCR diodes 215 and 216 each of which is connected in a resonant LC network as described hereinabove. The SCR diodes 215 and 216 are driven by simultaneous pulse signals applied to their trigger input terminals by the blocking oscillator 235. The blocking oscillator 235 is an astable free running oscillator. The frequency of switching of the SCR diodes 215 and 216 is controlled by periodically inhibiting the operation of the blocking oscillator 235. The input to inhibit the blocking oscillator 235 is controlled by the conduction state of the transistor 236. The blocking oscillator 235 can be frequency controlled by having the transistor 236 periodically conduct or the converter may be shut down by having the transistor 236 permanently conduct.

The current flow through the diodes 215 and 216 stores energy in the core of the transformer 210. This energy is periodically discharged, via the secondary winding 208 through the output diode 226 to the output terminals 231 and 232. A tertiary winding 220 is wound on the transformer core of the transformer 210. The tertiary winding 220 is connected, via a diode 237, and lead 238, to the transistor 236 and functions as a power limit control. This power limit control is utilized to inhibit the operation of the blocking oscillator 235 whenever the output diode 226 is conducting. This power limit control performs a protection function by inhibiting the operation of the blocking oscillator 235 as long as output current is flowing through diode 226. Hence, the converter may be operated into a shorted output without damage to its circuit components.

Operational amplifiers are utilized as feedback regulatory control circuits to regulate the output of the converter and provide protection against overcurrent and overvoltages conditions. These operational amplifiers monitor the various output signals of the converter and respond to control the frequency of the blocking oscillator or inhibit its operation or disconnect the converter from the load, depending upon the response needed to secure the desired regulation or protection.

VOLTAGE REGULATION

The output voltage of the converter is regulated at some predetermined value. This voltage is monitored by a voltage regulation operational amplifier 211. One input of the operational amplifier 211 is connected to the output terminal 231 of the converter via lead 242. A reference voltage source 28 is also connected to this same input. The output terminal 231 of the converter is connected to a reference ground 35. The other input terminal of the operational amplifier 211 is connected to the reference ground 35a which is the same potential as reference ground 35.

The sum of this reference voltage and the output voltage is applied to the one input of the voltage regulation operational amplifier 211. The voltage regulation operational amplifier 211 amplifies this signal and applies it to a comparator operational amplifier 213, via the diode 243 and resistor 246.

The terminal 207 of the secondary winding 208 is coupled, via the leads 244 and 245, to a synchronizing operational amplifier 212. Since this connection precedes the output filter of the converter, the synchronizing operational amplifier 212 amplifies the output ripple signal of the converter. The amplified ripple output of the synchronizing operational amplifier 212 is applied to the other input of the comparator operational amplifier 213, via resistor 247. The comparator operational amplifier 213 responds in a binary fashion to the outputs of the synchronizing operational amplifier 212 and the voltage regulation operational amplifier 211. If the output of the voltage regulation operational amplifier 211 exceeds the output of the synchronizing operational amplifier 212, the comparator operational amplifier 213 applies a signal, via diode 248 and resistor 249, to the base of transistor 236. The transistor 236 is biased conducting in response to this signal and its output to the blocking oscillator 235 inhibits its operation. Hence, it is apparent that if the output voltage exceeds a certain regulated value, the voltage regulation circuitry generates a signal to inhibit the operation of the blocking oscillator 235 driving the switching devices. The operation of the blocking oscillator is inhibited until the output voltage of the converter is reduced to its regulated value.

CURRENT REGULATION

The output current of the converter flows through a sensing resistor 229. The sensing resistor 229 has a very low impedance so as not to impair the efficiency of the converter. The low level voltage across the sensing resistor 229 is monitored by the current signal operational amplifier 203 whose input terminals shunt the sensing resistor 229. The low level voltage of the resistor 229 is amplified by the current regulating operational amplifier 204. A reference voltage source 21 is also connected to the input of the current regulating operational amplifier 204 to establish a response threshold. The current signal operational amplifier 203 inverts the voltage detected across the sensing resistor 229. The voltage supplied by the reference voltage source 21 is of opposite polarity to the output of the current signal operational amplifier 203. The current regulating operational amplifier 204 responds to the weighted sum of these two voltages. The output voltage signal of the current regulating operational amplifier 203 is applied, via a diode 251 and the resistor 246 to the input of the comparator operational amplifier 213. The weighting is such that when the full current load of the converter circuit occurs the voltage regulation amplifier 211 no longer controls the output state of the comparator operational amplifier 231 and the converter operates in a current regulation mode. The output of the comparator operational amplifier 213 is applied, via a diode 248 and resistor 249, to control the conductivity of the transistor 236 and in turn control the blocking oscillator 235, as described hereinabove with reference to the voltage regulation circuitry.

A feature of the current regulation circuitry important to the hereinbelow description of the overcurrent protection is that the current regulation does not work at output voltages below a minimum threshold. As long as the output voltage is above a certain threshold, as shown in FIG. 2 by waveform $g$, the current regulation circuitry is functional. When it drops below this level and the output current increases to a full load current, the voltage breakdown diode 299 connected to the input of the comparator operational amplifier 213 breaks down and establishes a minimum voltage threshold below which the current regulation ceases to operate. At this voltage threshold the power limit control described hereinabove takes over to control the blocking oscillator and continues to function until the resulting overcurrent either clears a protective device on the current bus or activates the overcurrent shutdown circuit described hereinbelow.

HIGH VOLTAGE SHUTDOWN

The output voltage of the converter is monitored by a high voltage monitoring operational amplifier 214. The imput lead 252 of the high voltage monitoring operational amplifier 214 is connected to output terminal 232 of the converter and to a reference voltage source 22. The output voltage and the reference voltage are summed. The high voltage monitoring operational amplifier 214 is a very high gain amplifier and when this summed voltage reaches a certain threshold it operates in a binary fashion. When this occurs the high voltage monitoring operational amplifier 214 applies a signal, via diode 254, to break down the breakdown diode 255. This signal triggers the SCR diode 257 into its conducting state. The SCR diode 257 is connected to the blocking oscillator 235 and inhibits the operation of the blocking oscillator 235. The anode of the SCR diode 257 is also connected, via lead 271, to a disconnect circuit 270 which is activated when the SCR diode 257 conducts. The output of the disconnect circuit 270 is applied, via lead 272, to activate the circuit breaking device 273 which disconnects the converter from the load. The separate arrangement disclosed here to inhibit the operation of the blocking oscillator 235 is included to provide added protection against possible failure of the normal inhibit control applied via the transistor 236. The SCR diode 257 when conducting diverts the charging current of the timing capacitor in the oscillatory circuitry of the blocking oscillator 235.

As described hereinabove, when converters are connected in parallel any high voltage condition which occurs will be common to all the converters. Hence, it is necessary to determine which converter is malfunctining. This is determined by finding the converter applying an overload current to the common bus. A current signal operational amplifier 201 monitors the output current flowing through the sensing resistor 229. The output voltage of the current signal operational amplifier 201 is proportional to the converter output current. This output is applied to the input of the high voltage monitoring operational amplifier 214, via lead 253, to serve as a bias signal. This bias signal modifies the voltage level at which the high gain high voltage monitoring operational amplifier 214 responds. This bias signal produces the linearly decreasing high voltage shutdown threshold that is shown by waveform $c$ in FIG. 2. As is apparent from this diagram, the shutdown threshold of the converter is considerably less at full rated current than at a smaller current.

LOW CURRENT VOLTAGE UPTILT

As described hereinabove, while the voltage regulation control constrains each of the converters connected in parallel to operate at the same voltage, they will not necessarily contribute the same current to the common bus or load. It is desirable, therefore, to constrain each converter to contribute at least a minimum current to the common bus or load. Forcing a minimum current contribution from each converter provides an easy and inexpensive means of detecting a failed or poorly adjusted converter. To achieve this result the output current of the converter flowing through the sensing resistor 229 is monitored by the current signal operational amplifier 210. The amplified voltage output of the current signal operational amplifier 202 is applied to a voltage regulating low current signal operational amplifier 202. A reference voltage source 26 is connected to the other input of the low current signal amplifier 202 to establish a threshold at which it operates. If the voltage output of the current signal operational amplifier 201 decreases below the threshold voltage established by the reference voltage source 26, the operational ampliifer 202 becomes active and applies an output bias signal linearly related to the current flowing through the sensing resistor 229 to the input of the voltage regulating operational amplifier 211. This bias signal is inversely proportional to the output current and modifies the operating response of the voltage regulating operational amplifier 211 so that the voltage at which the regulation circuitry regulates is increased. The output of the voltage regulation operational amplifier 211 is utilized in the same manner as described hereinabove to regulate the converter's output voltage. By increasing the regulated voltage at low current levels, as shown by waveform d in FIG. 2, each converter is constrained to supply at least a minimum current to the common bus or output load.

OVERCURRENT SHUTDOWN

As described hereinabove, the current regulation portion of the converter does not function below a certain output voltage level of the converter. When the converter output voltage drops below this level, the output current of the converter is free to increase beyond the regulated value. At this point the overcurrent shutdown protection may operate to shut down the converter if the output current exceeds a certain threshold at which overcurrent protection is desired. The output current of the converter is monitored by the current signal operational amplifier 201 as described above and its output voltage signal proportional to this current is applied to an overcurrent monitoring operational amplifier 206. A reference voltage source 24 is connected to the other input of the operational amplifier 206 to establish the input threshold at which the overcurrent monitoring operational amplifier 206 responds. The operational amplifier 206 includes a feedback capacitor 264 to introduce a delay into its response. This delay prevents the overcurrent protection for responding to momentary overloads. If the overcurrent persists beyond the delay established by the feedback capacitor 264, the overcurrent monitoring operational amplifier 206 applies an output signal, via diode 265 and the breakdown diode 255, to the trigger input of the SCR diode 257. This biases the SCR diode 257 into a conducting state and shuts down the blocking oscillator 235, and operates the disconnect circuit 270 to disconnect the converter from the load.

REVERSE CURRENT SHUTDOWN

Should an internal short circuit or fault occur within the converter, current will flow from the load and from the other parallel connected converters into the malfunctioning converter. Reverse current protection is provided by monitoring the direction of current in the output circuit of the converter. The output polarity of the current signal operational amplifier 203 is indicative of the direction of current through the sensing resistor 229. The current flowing into the output filter capacitor 230 is monitored by sensing the voltage across the series connected resistor 233. The voltage across this resistor is applied to a reverse current monitoring operational amplifier 277. The outputs of the current signal operational amplifier 203 and the reverse current monitoring operational amplifier 277 are combined in a diode bridge 267 and applied to a reverse current level detecting operational amplifier 205.

The diode bridge 267 is poled to transmit only voltage signals indicative of reverse currents in the resistors 229 and 233.

The operational amplifier 205 includes a feedback capacitor 276 to introduce a time delay so it does not respond to momentary reverse currents. A reference voltage source 29 is connected to the operational amplifier 205 to set the threshold at which the delay operates. When the reverse current detected is sufficient in magnitude and duration to operate the reverse current level detecting operational amplifier 205, it applies an output signal via the diode 268 and the breakdown diode 255 to operate the SCR diode 257 and hence shut down the blocking oscillator 235 and disconnect the converter load by actuating the disconnect circuit 270.

It is apparent from the foregoing description that many various schemes and approaches may be improvised to apply the features of applicant's invention to permit converters to operate in parallel. While the above description has been confined to one embodiment implementing these features, many alternative ways will suggest themselves to those skilled in the art without departing from the spirit and scope of the invention.

What is claimed is:

1. In a converter circuit, control circuit means to control the output of said converter comprising, means to regulate the current output of said converter, means to monitor the voltage output of said converter, a reference voltage source, means to compare the voltage monitored by said means to monitor with the reference voltage of said source, means responsive to said means to compare to disable said means to regulate the current when said voltage monitored decreases below the reference voltage of said source, means to establish a current threshold larger than the regulated current value, and means to shut down the converter when its current output exceeds said current threshold.

2. In a converter circuit as described in claim 1 wherein said converter includes output means to connect to a load, said means to control the output includes means to monitor the direction of current flow in the output means of said converter, and means to actuate said means to shut down and means to disconnect said output means from a load if a particular current direction is detected.

3. A power supply comprising switching means, output means, means to monitor the current of said output means, a current reference signal, means to compare the current sensed by said means to monitor with said current reference signal, current regulation means responsive to said means to compare to control the switching of said switching means, wherein the improvement comprises, means to monitor the output voltage of said output means, means to disable said current regulation means responsive to said means to monitor the output voltage when the output voltage is below a predetermined threshold, and overcurrent shutdown means to shut down the power supply in response to an overcurrent.

4. A power supply as defined in claim 3 wherein the improvement further includes, means to monitor the direction of current flow in said output means, level detector means responsive to said means to monitor the direction of current, and means responsive to said level detector means to actuate said overcurrent shutdown means.

5. A DC to DC converter connected to an output comprising means to regulate the current ouput of said converter including means to sense the current output, a current reference signal source, means to compare the current output sensed by said means to sense the current output with the signal of said current reference signal source, and means responsive to said means to compare to control the current output of said converter wherein the improvement comprises means to monitor the voltage output of said converter, a voltage reference signal source, means to disable said means to compare when the voltage detected by said means to monitor the voltage output decreases below the signal of said voltage reference signal source, a first operational amplifier connected as an amplifier to detect the current in said means to sense the current output, an overcurrent reference signal source, a second operational amplifier responsive to said first operational amplifier and said overcurrent reference signal source, said second operational amplifier generating a signal in response to an overcurrent, and means responsive to said second operational amplifier to disconnect said converter from said output.

6. A DC to DC converter as defined in claim 5 wherein said output includes filter capacitor and wherein the improvement further comprises a third operational amplifier connected as an amplifier to detect the current in said means to sense the current output, a second means to sense current connected in series with said filter capacitor, a fourth operational amplifier connected as an amplifier to detect the current in said second means to sense current, a fifth operational amplifier connected as an amplifier, a reverse current reference signal source connected to said fifth operational amplifier to establish a signal response threshold, means to couple the output of said third and fourth operational amplifiers to said fifth operational amplifier and said means responsive to disconnect said converter from said output being responsive to the output of said fifth operational amplifier.

7. A DC to DC converter as defined in claim 6 wherein the improvement further comprises means included in said second and fifth operational amplifiers to delay a response to input signals.

8. A DC to DC converter as defined in claim 5 wherein said means to disable comprises a clamping means connected to the input of said means to compare.

* * * * *

UNITED STATES PATENT OFFICE
CERTIFICATE OF CORRECTION

Patent No. 3,805,142                Dated April 16, 1974

Inventor(s) Robert Rando

It is certified that error appears in the above-identified patent and that said Letters Patent are hereby corrected as shown below:

Column 1, line 37, change "applied" to --supplied--; line 44, change "to" to --into--. Column 4, line 18, change "of" to --to--. Column 5, line 31, after "voltage" insert --condition--. Column 8, line 29, change "overvoltages" to --overvoltage--. Column 10, line 63, change "210" to --201--. Column 11, line 42, change "for" to --from--. Column 12, line 64, change "the" to --said--.

Signed and sealed this 29th day of October 1974.

(SEAL)
Attest:

McCOY M. GIBSON JR.
Attesting Officer

C. MARSHALL DANN
Commissioner of Patents